(12) United States Patent
Cahill et al.

(10) Patent No.: US 7,917,761 B2
(45) Date of Patent: Mar. 29, 2011

(54) DIGITALLY SIGNING AN ELECTRONIC DOCUMENT WITH A USER-ENTERED SIGNATURE IMAGE

(75) Inventors: Jason Cahill, Woodinville, WA (US); John Fan, Duvall, WA (US); Jeffrey Johnson, Bellevue, WA (US); Lauren Antonoff, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1145 days.

(21) Appl. No.: 11/087,160

(22) Filed: Mar. 21, 2005

(65) Prior Publication Data

US 2006/0212707 A1   Sep. 21, 2006

(51) Int. Cl.
*H04L 9/32*   (2006.01)
*G06K 9/00*   (2006.01)

(52) U.S. Cl. ........ 713/176; 713/180; 382/119; 715/224; 715/780

(58) Field of Classification Search .................. 713/176, 713/180, 156, 175; 382/115, 119; 715/224, 715/780
See application file for complete search history.

(56) References Cited

U.S. PATENT DOCUMENTS

| | | | | |
|---|---|---|---|---|
| 5,555,496 A * | 9/1996 | Tackbary et al. | ................ | 705/27 |
| 6,411,784 B1 * | 6/2002 | Taniguchi | ......................... | 399/6 |
| 6,671,805 B1 * | 12/2003 | Brown et al. | ................. | 713/176 |
| 6,757,826 B1 * | 6/2004 | Paltenghe | ...................... | 713/170 |
| 6,779,178 B1 * | 8/2004 | Lloyd et al. | .................... | 717/174 |
| 7,165,178 B2 * | 1/2007 | Gien et al. | ...................... | 713/176 |
| 7,178,030 B2 * | 2/2007 | Scheidt et al. | ................ | 713/176 |
| 7,302,585 B1 * | 11/2007 | Proudler et al. | ............. | 713/189 |
| 7,406,599 B1 * | 7/2008 | Pravetz et al. | ................ | 713/176 |
| 7,436,989 B2 * | 10/2008 | Chung et al. | .................. | 382/119 |
| 7,502,934 B2 * | 3/2009 | Dietl | ............................. | 713/176 |
| 7,694,145 B1 * | 4/2010 | Pravetz et al. | ................ | 713/176 |
| 7,698,230 B1 * | 4/2010 | Brown et al. | ................... | 705/75 |
| 2004/0102959 A1 * | 5/2004 | Estrin | ............................... | 704/8 |

FOREIGN PATENT DOCUMENTS

EP        950992 A2   * 10/1999
WO   WO00/11834 A1  *  3/2000

* cited by examiner

*Primary Examiner* — Zachary A Davis
(74) *Attorney, Agent, or Firm* — Merchant & Gould

(57) ABSTRACT

Methods, systems, and computer program products digitally sign an electronic entity, such as an electronic document, with a user-entered signature image. The method involves rendering the document and rendering a sign dialog. Rendering the sign dialog includes prompting the signer to write a signature to sign the document. The method also involves receiving and inking the signature from the signer, creating a digital representation incorporating an image of the signature; creating a unique value of the image of the signature and of the document, and saving the unique value in association with the document thereby digitally signing the document. The unique value saved in association with the document is verifiable for authenticity by users of the document. Additionally, the method may also involve automatically selecting a signing certificate appropriate for the signer based on selection criteria.

14 Claims, 8 Drawing Sheets

DIGITALLY SIGNING AN ELECTRONIC DOCUMENT WITH A USER-ENTERED SIGNATURE IMAGE

TECHNICAL FIELD

The present invention generally relates to digitally signing documents, and more particularly, is related to methods, systems and computer program products for digitally signing an electronic document with a user-entered signature image.

BACKGROUND

Digital documents are widespread in society today. However, at some point or another, it usually becomes necessary to print these documents in order to complete or execute them. Businesses, government agencies, and individuals are seeking methods of keeping documents in the digital domain for the life of the document, from cradle to grave. One reason this objective has evaded many is due to the need to sign documents in order to execute them. Although digital signatures are supported in some applications, the functionality is not intuitive and doesn't meet some basic customer requirements, for instance signature verification capability in foreign environments may not be possible.

Previous systems for digital signing require a user to pick a signing certificate from a non-intuitive list of computer signing certificates. Signing certificates may be purchased from a signing authority. However, there is no intuitive way to sign electronic documents. Most implementations show canned, generally textual only, representations. However, canned pictures of signatures are very different than the intuitive practice of actually taking a pen and writing or scrawling a signature on each signature line of a document.

Accordingly there is an unaddressed need in the industry to address the aforementioned deficiencies and inadequacies.

SUMMARY

Embodiments of the present invention provide methods, systems, and computer program products for digitally signing an electronic document with a user-entered signature image. Embodiments of the present invention may be executed on a tablet personal computer (PC) or a PC that is equipped with a graphics tablet. A user can actually sign his or her name on a signing line displayed via a tablet PC or graphics tablet. Embodiments of the present invention ink the signature in real time to collect and transition the signature to become a digital picture that represents the signature of the user in the document. Thus, embodiments of the present invention, by uniting the signing process to the inking process in software, allow a user to digitally sign a document.

One embodiment is a method for digitally signing an electronic document with a user-entered signature image. The method involves rendering the document and rendering a sign dialog. Rendering the sign dialog may include prompting the signer to write the signature in order to sign the document. The method also involves receiving and inking the signature from the signer via the sign dialog, creating a digital representation that incorporates an image of the signature, creating a unique value of the image of the signature and of the document, and saving the unique value in association with the document thereby digitally signing the document. The unique value saved in association with the document is verifiable for authenticity by users of the document. Additionally, the method may also involve selecting a signing certificate appropriate for the signer based on selection criteria.

Another embodiment is a computer program product including a computer-readable medium having control logic stored therein for causing a computer to digitally sign an electronic document with a user-entered signature image. The control logic includes computer-readable program code for causing the computer to render the document and render a sign dialog. The computer program product also includes computer-readable program code for causing the computer to receive and ink the signature from a user, create a digital representation that includes an image of the signature, create a unique value of the image of the signature and of the document, and save the unique value in association with the document thus, digitally signing the document.

Still another embodiment is a computer-implemented system for digitally signing an electronic document with a user-entered signature image. The system includes a computing apparatus having a display screen and an input device operative to render the document and render a sign dialog. The computing apparatus is also operative to receive and ink the signature from the user, create a digital signature that includes an image of the signature, create a unique value of the image of the signature and of the document, and save the unique value in association with the document thereby digitally signing the document.

The invention may be implemented utilizing a computer process, a computing system, or as an article of manufacture such as a computer program product or computer-readable media. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
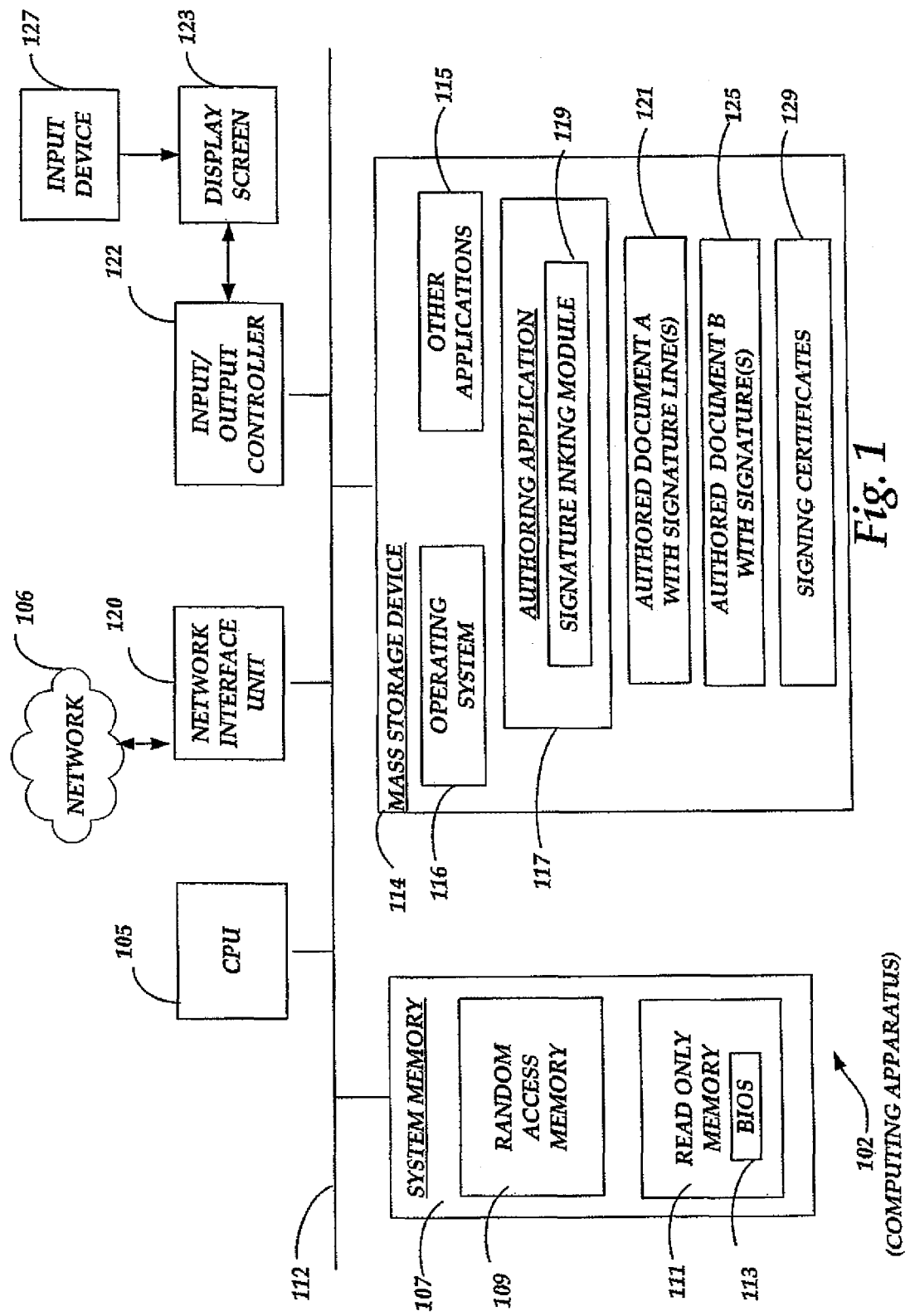
FIG. 1 is a computing system architecture illustrating a computing apparatus utilized in and provided by various illustrative embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer (PC), those skilled in the art will recognize that the invention may also be implemented in combination with other types of computer systems and program modules, such as a tablet PC and tablet operating system.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a computing system architecture illustrating a computing apparatus 102 utilized in and provided by various illustrative embodiments of the invention will be described. The computer architecture shown in FIG. 1 illustrates the computing apparatus 102, including a central processing unit 105 ("CPU"), a system memory 107, including a random access memory 109 ("RAM") and a read-only memory ("ROM") 111, and a system bus 112 that couples the memory to the CPU 105. A basic input/output system 113 (BIOS) containing the basic routines that help to transfer information between elements within the computer, such as during startup, is stored in the ROM 111. The computing apparatus 102 further includes a mass storage device 114 for storing an operating system 116, application programs, and other program modules, which will be described in greater detail below.

The mass storage device 114 is connected to the CPU 105 through a mass storage controller (not shown) connected to the bus 112. The mass storage device 114 and its associated computer-readable media provide non-volatile storage for the computing apparatus 102. Although the description of computer-readable media contained herein refers to a mass storage device, such as a hard disk or CD-ROM drive, it should be appreciated by those skilled in the art that computer-readable media can be any available media that can be accessed by the computing apparatus 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVDS"), or other optical storage, magnetic cassettes, magnetic tape, magnetic disk storage or other magnetic storage devices, or any other medium which can be used to store the desired information and which can be accessed by the computing apparatus 102.

According to various embodiments of the invention, the computing apparatus 102 may operate in a networked environment using logical connections to remote computers through the network 106, such as the Internet or intranet. The computing apparatus 102 may connect to the network 106 through a network interface unit 120 connected to the bus 112. It should be appreciated that the network interface unit 120 may also be utilized to connect to other types of networks and remote computer systems. The computing apparatus 102 may also include an input/output controller 122 for receiving and processing input from a number of other devices, including a keyboard, mouse, or electronic stylus (not shown). Similarly, an input/output controller 122 may provide output to a display screen 123, a printer, or other type of output device. The input/output controller may also receive input via the display screen 123 by the use of a graphics tablet pen input device 127 utilized in conjunction with inking technology.

As mentioned briefly above, a number of program modules and data files may be stored in the mass storage device 114 and RAM 109 of the computing apparatus 102, including an operating system 116 suitable for controlling the operation of a networked personal computer, such as the WINDOWS XP operating—system from MICROSOFT CORPORATION of Redmond, Wash. The mass storage device 114 and RAM 109 may also store one or more other program modules. In particular, the mass storage device 114 and the RAM 109 may store an authoring application (AA) 117, such as MICROSOFT WORD from MICROSOFT CORPORATION of Redmond, Wash. The AA 117 authors digitally signable documents such as document A 121 having one or more signature lines and document B 125 having one or more digital signatures. The AA 117 includes a Signature Inking module 119 that is operative to ink a signature as a digital representation of a document that is digitally signable. The AA 117 also selects a signing certificate for use in digitally signing the document from among signing certificates 129 stored on the mass storage device 114.

According to one embodiment of the invention, the AA 117 and other application programs 115 may comprise the OFFICE suite of application programs from MICROSOFT CORPORATION including the WORD, EXCEL, and POWERPOINT application programs. The other application programs 115 may also include a web browser application, such as INTERNET EXPLORER from MICROSOFT CORPORATION and an electronic mail application, such as OUTLOOK from MICROSOFT CORPORATION.

Figure 2:
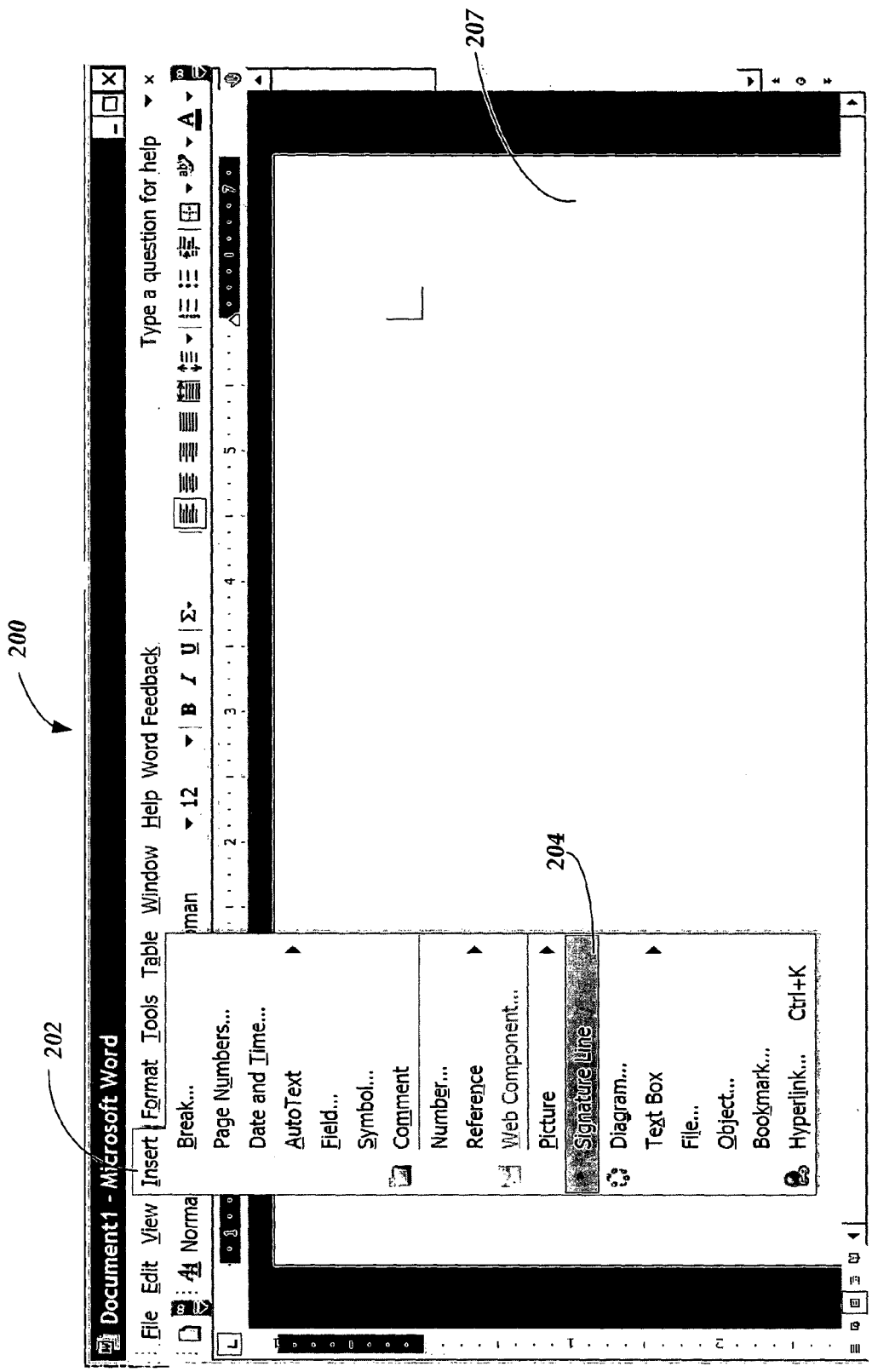
FIG. 2 depicts a computer screen display illustrating a user interface for an authoring application displaying an option to insert a signature line according to an illustrative embodiment of the present invention.

FIG. 2 depicts a computer screen display illustrating a user interface 200 for the authoring application 117 displaying an option 204 to insert a signature line according to an illustrative embodiment of the present invention. The user interface 200 may be displayed via the display screen 123 of the computing apparatus 102. The user interface 200 is accessed when a user selects an Insert menu 202 to insert a signature line. The user may select the option 204 to insert one or more signature lines that can be signed by typing or signing a name.

Figure 3:
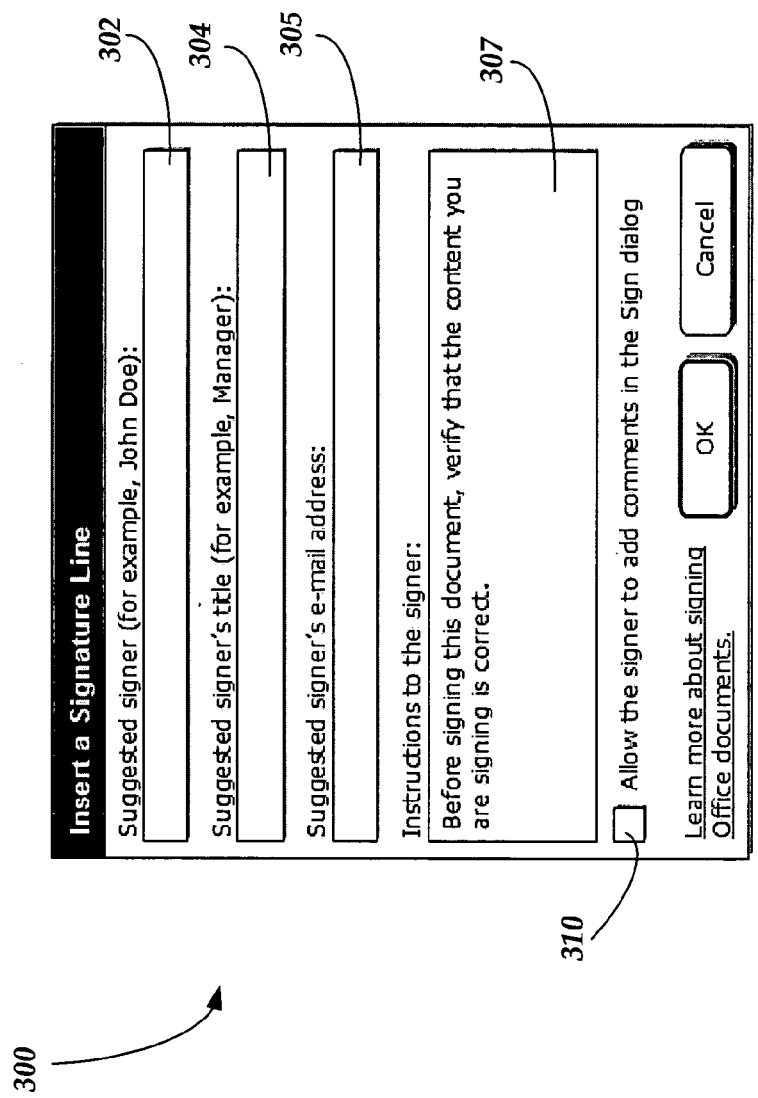
FIG. 3 depicts a computer screen display illustrating a user interface displaying a signature line setup dialog according to an illustrative embodiment of the present invention.

FIG. 3 depicts a computer screen display illustrating a user interface displaying a signature line setup dialog 300 according to an illustrative embodiment of the present invention. The signature line setup dialog 300 may also be displayed to a user via the display screen 123. The Signature Line setup dialog 300 may be shown before a user can insert a signature line in the document 207. The fields in this dialog are a suggested signer field 302 for receiving the name of the user to show on a first line under the signature line, a suggested signer's title field 304 for receiving text a user would like to show on a second line under the signature line, and a suggested signer's e-mail address field 305 which may not be shown in the signature line user interface, but may be used to send the document to the signer. The fields also include signature instructions 307 shown to the signer in a sign dialog 500 (see FIG. 5) and a checkbox 310 for "Allow the signer to add comments in the Sign dialog" provides a single line text box in the sign dialog 500 with the caption "Purpose for signing this document (optional):"

Figure 4:
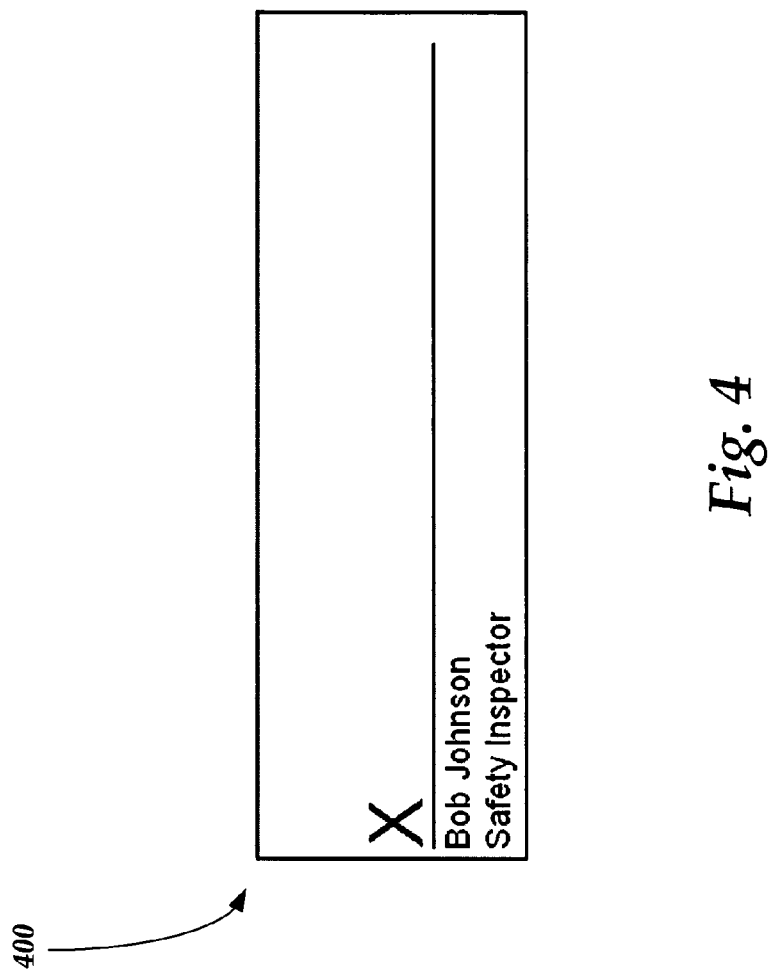
FIG. 4 depicts a computer screen display illustrating a user interface displaying an access dialog to sign a document according to an illustrative embodiment of the present invention.

FIG. 4 depicts a computer screen display illustrating a user interface displaying a signature line 400 according to an illustrative embodiment of the present invention. Upon completion of the signature line setup dialog 300, the signature line 400 is displayed in the document 207. When a user double clicks or right clicks on the signature line 400, the sign dialog 500 is rendered.

Figure 5:
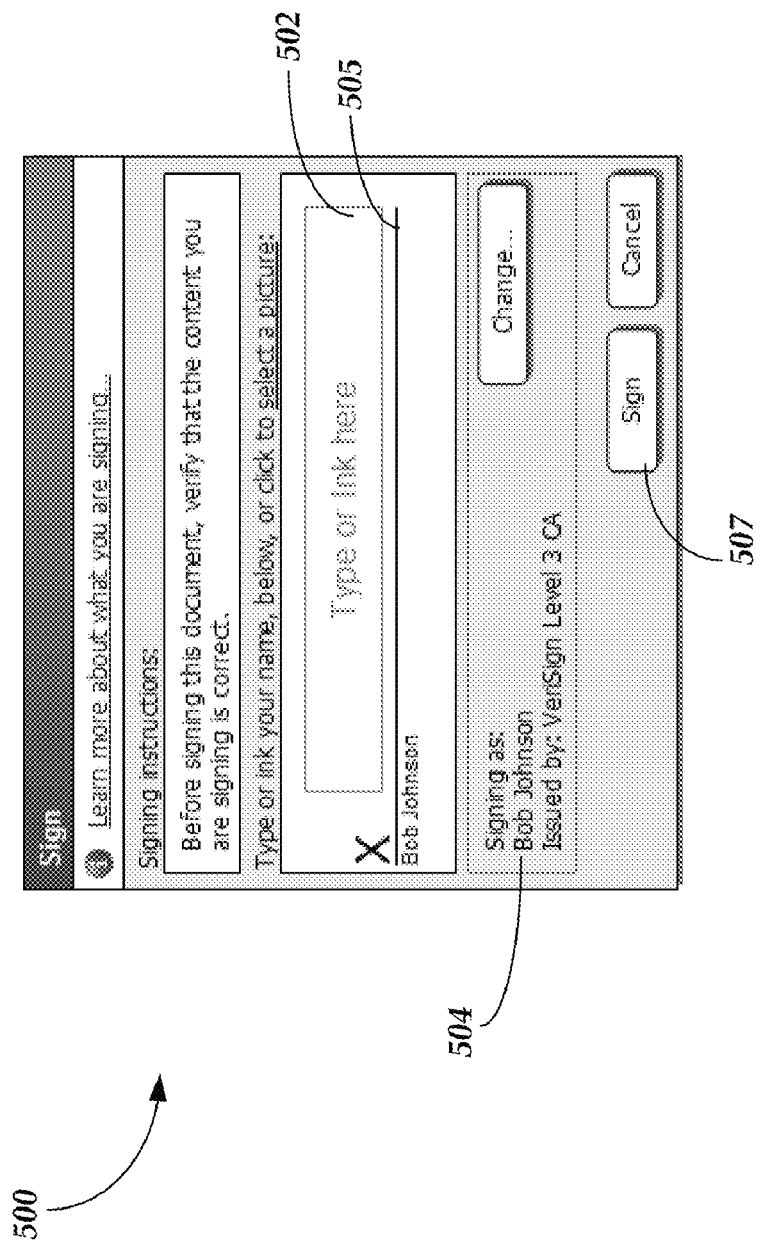
FIG. 5 depicts a computer screen display illustrating a user interface displaying a document sign dialog according to an illustrative embodiment of the present invention.

FIG. 5 depicts a computer screen display illustrating a user interface displaying a document sign dialog 500 according to an illustrative embodiment of the present invention. The sign dialog 500 is shown when a user double-clicks or right clicks on the signature line 400. The steps to complete this document are:

1. Read the instructions
2. Type, ink, or click "select a picture. . ."
3. Verify that the appropriate certificate to sign with has been selected.
4. Click Sign The AA 117 inks the signature from the signer at an "ink here" box 502 displayed in the sign dialog 500 with sign line 505. The signing certificate is verified in a verification section 504. And clicking a sign button 507 activates the digital signing process.

If the user that set up this signature dialog checked "Allow the signer to add comments in the Sign dialog", a single line text box in the Sign dialog with the caption "Purpose for signing this document:" is provided. The "Purpose for signing" comments are optional because intent to sign is shown by typing, inking, or selecting a picture.

Figure 6:
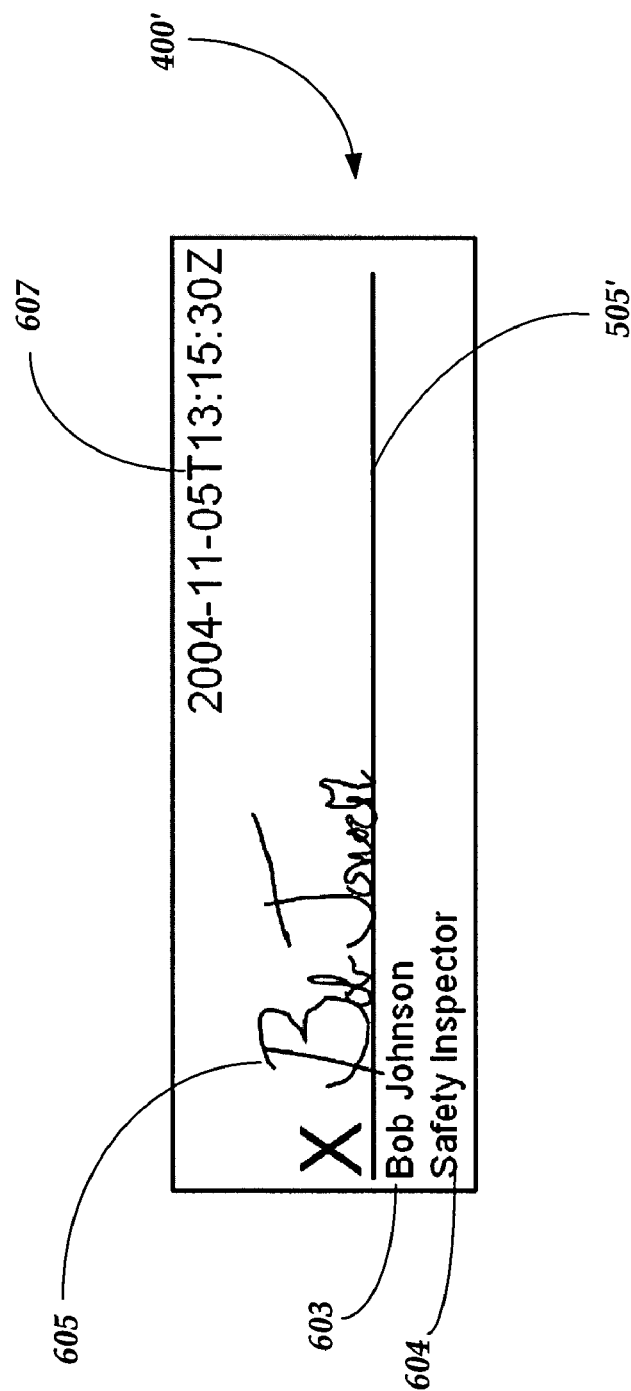
FIG. 6 depicts a computer screen display illustrating a user interface displaying a signature line with an inked signature according to an illustrative embodiment of the present invention.

FIG. 6 depicts a computer screen display illustrating a user interface displaying a signature line 400' with an inked signature 605 displayed according to an illustrative embodiment of the present invention. The signature line 400' illustrates the suggested name of the signer 603 on the first line under the sign line 505' and the suggested title of the signer 604 on the second line under the sign line 505'. When the user writes his signature in the signature line 400', the AA 117 inks the signature 605. The AA 117 also displays a date and time of signature 607 when the signature is inked.

Figure 7:
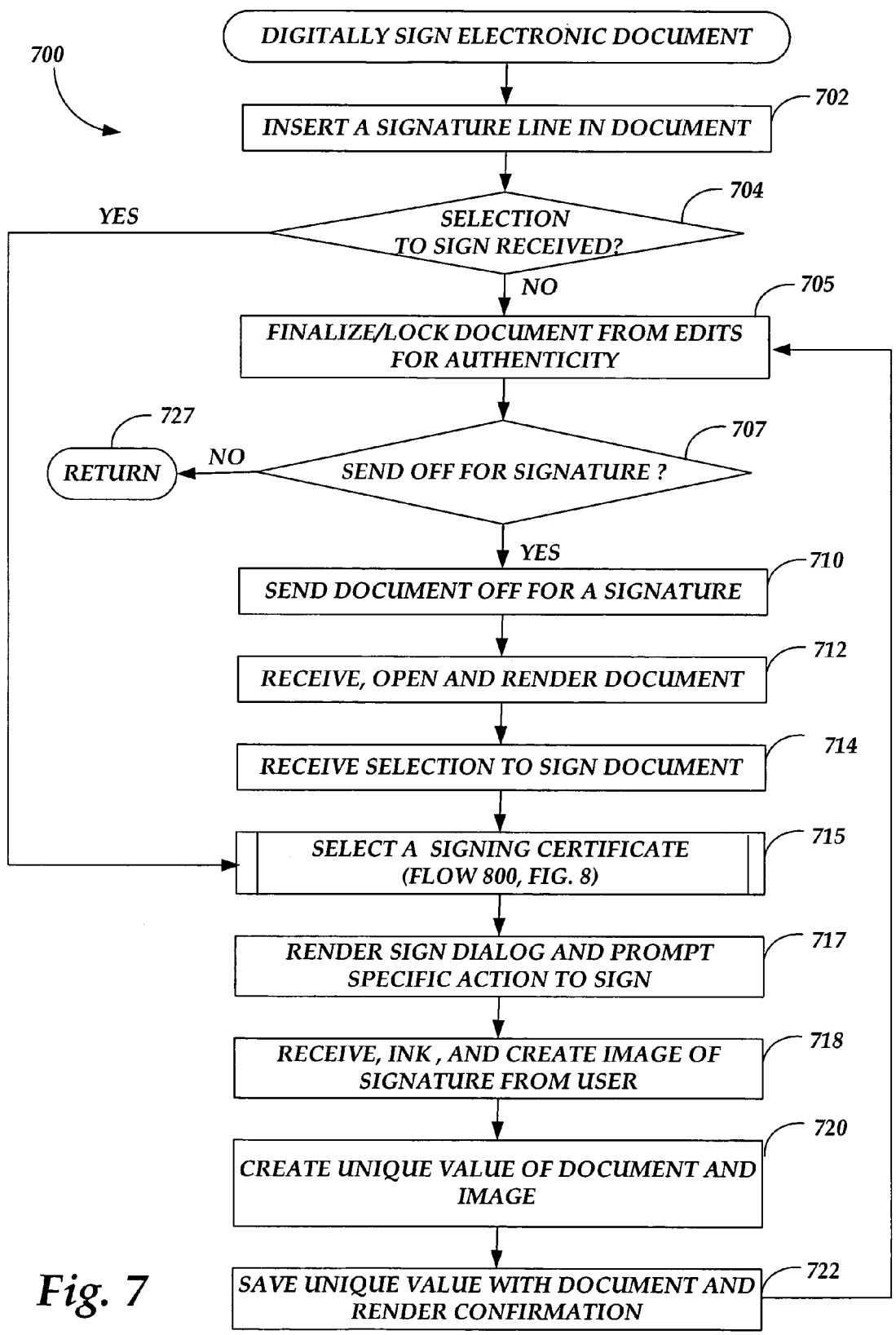
FIG. 7 is an operational flow diagram illustrating operations performed in digitally signing an electronic document with a user-entered signature image according to an illustrative embodiment of the present invention.
Figure 8:
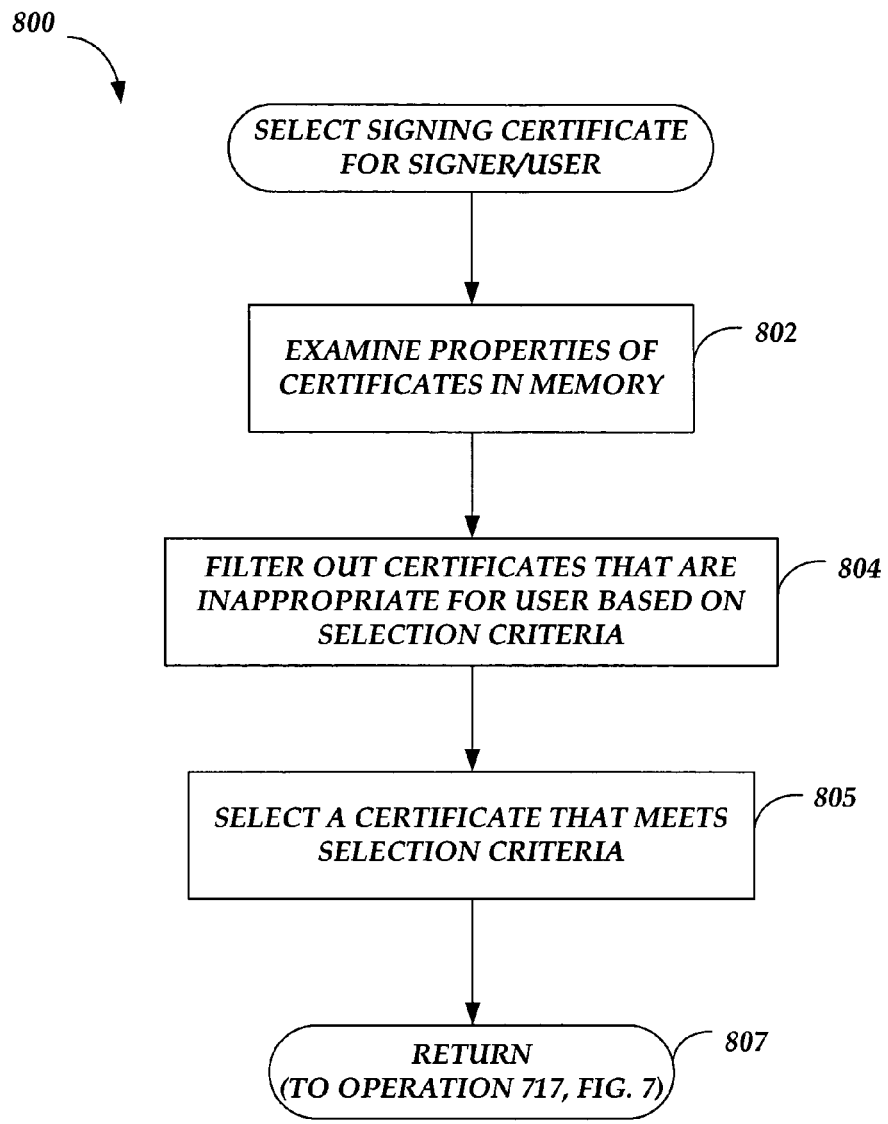
FIG. 8 is an operational flow diagram illustrating operations performed in selecting a signing certificate for a user according to an illustrative embodiment of the present invention.

FIGS. 7-8 are illustrative routines or operational flows performed in digitally signing an electronic document with a user-entered image of a signature according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 7-8, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 7 is an operational flow diagram 700 illustrating operations performed in digitally signing an electronic document with a user-entered image of a signature according to an illustrative embodiment of the present invention. The operational flow 700 begins at operation 702 where the AA 117 inserts a signature line into a document, such as the document A 121 (FIG. 1).

Next, at operation 704 the AA 117 determines whether a selection to sign the document now has been received. When a selection to sign has been received the operational flow 700 continues to operation 715 described below. This selection may be a right click and selection on the signature line. When a selection to sign now has not been received, the operational flow continues to operation 705.

At operation 705, the AA 117 finalizes the document by locking the document from edits to secure the authenticity of the document. Next at operation 707, a determination is made as to whether the document is to be sent to a signer for signature, for instance by electronic mail as an attachment. If the document is not to be sent off for signature, the operational flow 700 returns control to other routines at return operation 727. If the document is to be sent off for signature, the operational flow 700 continues from operation 707 to operation 710.

At operation 710, the AA 117 sends the document off for signature. Then at operation 712, another authoring application similar to the AA 117 receives, opens, and renders the document to a signer via a computing apparatus similar to the computing apparatus 102. Upon loading or opening the document, the authoring application verifies whether the document has a signature line that is unsigned, signed, or signed with an invalid signature because the document has been tampered with or changed.

The signer may find the signature line in the document and select to sign the document. The authoring application receives the selection to sign at operation 714. Then at operation 715, the authoring application selects a signing certificate for the signer or user in accordance with selection criteria. Additional details regarding selecting a signing certificate will be described below with respect to FIG. 8.

Next, the operational flow 700 continues from operation 715 to operation 717, where the authoring application renders the sign dialog 500 to the signer. The sign dialog prompts a user to take an explicit action to sign the document, such as writing his or her signature. This ensures manifested intent to sign on the part of the user.

The operational flow 700 then continues to operation 718 where the authoring application receives, inks, and creates a digital image of the signature of the user. Next, the operation creates a unique value of the image of the signature and the document at operation 720. In an illustrative embodiment, the image may be embedded in an XML digital signature that includes an object XML element containing the embedded image as a signed reference. Creating the unique value involves calculating the unique value based on the document and image, incorporating the image of the inked signature, and associating the unique value with the signing certificate selected. As is understood by those skilled in the art, XML is a standard format for communicating data. In the XML data format, a schema is used to provide XML data with a set of grammatical and data type rules governing the types and structure of data that may be communicated.

Next, at operation 722, the authoring application saves the digital representation with the document thereby digitally signing the document. The authoring application may also render to the user a confirmation that the document is signed. The operational flow then continues to operation 705 described above.

FIG. 8 is an operational flow diagram 800 illustrating operations performed in selecting a signing certificate for a user according to an illustrative embodiment of the present invention. The operational flow 800 begins at operation 802 where the authoring application, such as the AA 117, examines properties of signing certificates stored in the memory of the computing apparatus rendering the document.

Next, at operation 804, the authoring application filters out certificates that do not match selection criteria. For example signing certificates inappropriate for a user such as certificates used for network authentication or for code signing, are filtered out. Also companies have the ability to specify specific filter strains that they desire to implement as selection criteria in selecting exactly the right certificate for the end user. One value of this being that more end users are able to sign correctly without non-intuitively thinking about how to digitally sign.

Then at operation 805, the authoring application selects the signing certificate from among signing certificates that match the selection criterion prior to receiving and inking the signature from the signer. The operational flow 800 then returns control to operation 715 (FIG. 7) at return operation 807.

Based on the foregoing, it should be appreciated that the various embodiments of the invention include methods, systems, and computer-readable mediums for digitally signing an electronic document with a user-entered image of a signature. The above specification, examples and data provide a complete description of the manufacture and use of the composition of the invention. Since many embodiments of the invention can be made without departing from the spirit and scope of the invention, the invention resides in the claims hereinafter appended.

We claim:
1. A method for digitally signing an electronic document with a user-entered image of a signature, the method comprising:
rendering the document;
examining properties of each of a plurality of signing certificates available to the user;
in response to examining the properties, filtering out signing certificates that are used for network authentication and for code signing from among the plurality of signing certificates to determine signing certificates that match a selection criterion;
selecting a signing certificate from among the signing certificates that match the selection criterion;
rendering a sign dialog associated with the document;
receiving a signature from a user, wherein receiving the signature from the user comprises receiving a written signature from the user;
creating a digital representation that includes an image of the written signature of the user;
creating a single unique value, the single unique value representative of both the image of the written signature of the user and of the document; and
saving the unique value in association with the document thereby digitally signing the document, wherein saving the unique value in association with the document includes associating the unique value with the signing certificate selected.

2. The method of claim 1, further comprising:
inserting a signature line in the document wherein rendering the document comprises rendering the document including the signature line; and
receiving a selection to sign the document at the signature line.

3. The method of claim 1, further comprising:
locking the document from edits to secure the authenticity of the document; and
forwarding the document to another user for a second signature.

4. The method of claim 1, further comprising:
receiving and loading the document prior to rendering the document; and
verifying signed content of the document upon loading the document.

5. The method of claim 1, wherein rendering the sign dialog comprises prompting the user to write the signature with an input device in order to sign the document.

6. The method of claim 1, further comprising, prior to rendering a sign dialog associated with the document:
rendering a signature line setup dialog comprising a plurality of fields;
displaying a suggested signer field for receiving a name of the user for display on a first line under a signature line for signing the document;
displaying a suggested signer's title field for receiving text for display on a second line under the signature line;
displaying a suggested signer's e-mail address field for receiving an e-mail address for sending the document to the signer;
displaying a signature instructions field for displaying signing instructions; and
displaying a checkbox field, which, when selected by the user, provides a single line text box in the sign dialog for adding signer comments.

7. The method of claim 6, wherein rendering a sign dialog associated with the document further comprises rendering a sign dialog for displaying the signature line to the user.

8. One or more computer readable media, wherein the one or more computer readable media do not consist of a propagated data signal, the one or more computer readable media having stored thereon computer-executable instructions that, when executed by a processor, will cause a computer to perform a method of digitally signing an electronic document with a user-entered image of a signature, the method comprising:
rendering the document;
examining properties of each of a plurality of signing certificates available to the user;
in response to examining the properties, filtering out signing certificates that are used for network authentication and for code signing from among the plurality of signing certificates to determine signing certificates that match a selection criterion;
selecting a signing certificate from among the signing certificates that match the selection criterion;
rendering a sign dialog associated with the document;
receiving a signature from a user, wherein receiving the signature from the user comprises receiving a written signature from the user;
creating a digital representation that includes an image of the written signature received from the user;

creating a single unique value, the single unique value representative of both the image of the written signature of the user and of the document; and saving the unique value in association with the document thereby digitally signing the document, wherein saving the unique value in association with the document includes associating the unique value with the signing certificate selected.

9. The one or more computer readable media of claim 8, wherein the method performed by the computer as a result of the computer-executable instructions contained therein, further comprises:

inserting a signature line in the document, wherein the document includes the signature line when the document is rendered; and receiving a selection to sign the document at the signature line.

10. The one or more computer readable media of claim 8, wherein the method performed by the computer as a result of the computer-executable instructions contained therein, further comprises:

locking the document from edits to secure the authenticity of the document;

receiving and loading the document prior to rendering the document; and verifying signed content of the document upon loading the document.

11. The one or more computer readable media of claim 8, wherein the method performed by the computer as a result of the computer-executable instructions contained therein comprising rendering the sign dialog further comprises prompting a user to write the signature with an input device in order to sign the document.

12. A system for digitally signing an electronic document with a user-entered image of a signature, the system comprising:

a computing apparatus, including a display screen and an input device, operative to:

render the document;

examine properties of each of a plurality of signing certificates available to the user;

in response to examining the properties, filter out signing certificates that are used for network authentication and for code signing from among the plurality of signing certificates to determine signing certificates that match a selection criterion;

select a signing certificate from among the signing certificates that match the selection criterion;

render a sign dialog associated with the document;

receive a signature from a user, wherein the signature comprises a written signature from the user;

create a digital signature that includes an image of the written signature from the user;

create a single unique value, the single unique value representative of both the image of the written signature from the user and of the document; and save the unique value in association with the document thereby digitally signing the document, wherein the unique value is associated with the signing certificate automatically selected.

13. The system of claim 12, wherein the computing apparatus is further operative to:

insert a signature line in the document wherein the document rendered includes the signature line; and receive a selection to sign the document at the signature line.

14. The system of claim 12, wherein the computing apparatus operative to render the sign dialog is operative to prompt the user to write the signature on a surface of the display screen with the input device to sign each document.

* * * * *